US006959624B2

(12) United States Patent
Knuston et al.

(10) Patent No.: US 6,959,624 B2
(45) Date of Patent: Nov. 1, 2005

(54) APPARATUS AND METHOD FOR SETTING STONES IN JEWELRY

(75) Inventors: Kelly Knuston, Bay City, WI (US); Todd Sarnstrom, Ellsworth, WI (US)

(73) Assignee: Jostens, Inc., Minneapolis, MN (US)

( * ) Notice: Subject to any disclaimer, the term of this patent is extended or adjusted under 35 U.S.C. 154(b) by 0 days.

(21) Appl. No.: 10/223,522

(22) Filed: Aug. 19, 2002

(65) Prior Publication Data

US 2004/0031357 A1 Feb. 19, 2004

(51) Int. Cl.[7] .................................................. B23P 5/00
(52) U.S. Cl. ............................ 81/7; 29/10; 29/896.412
(58) Field of Search ..................... 81/7; 29/10, 896.41, 29/896.412; 968/735

(56) References Cited

U.S. PATENT DOCUMENTS

| | | | | | |
|---|---|---|---|---|---|
| 555,447 | A | * | 2/1896 | Hunter | 29/10 |
| 1,519,040 | A | * | 12/1924 | Nedland | 29/10 |
| 1,600,142 | A | * | 9/1926 | Rothenberg et al. | 81/7 |
| 4,329,890 | A | * | 5/1982 | Ferstenberg | 81/7 |

* cited by examiner

*Primary Examiner*—D. S. Meislin
(74) *Attorney, Agent, or Firm*—Dorsey & Whitney LLP

(57) ABSTRACT

A apparatus and method for setting stones in jewelry is disclosed. The apparatus includes two or more wheels and a jewelry mount secured to a body. The body is configured to bring the wheels in contact with a set edge of an item of jewelry secured in the jewelry mount. The wheels are then rotated about the periphery of the set edge to roll the edge over the stone and thereby, to secure the stone in the setting.

11 Claims, 4 Drawing Sheets

APPARATUS AND METHOD FOR SETTING STONES IN JEWELRY

BACKGROUND OF THE INVENTION

1. Field of the Invention

The present invention relates to the manufacture of jewelry and, more particularly, relates to the setting of stones in jewelry.

2. Description of the Related Art

Decorative stones are frequently secured to jewelry such as rings, earrings, bracelets, watches, necklace, broaches and other items. These stones may be precious or semiprecious gemstones, or may be glass or synthetic materials that are secured in place in settings using formed meal or metal projections that extend over the top of the stone table to hold the stone against a seat. Frequently, the formed metal is in the form of a set edge. The set edge extends around the setting and is configured to roll over the top of the stone table to secure the stone in the setting. The techniques for rolling a set edge over the top of the stone table have typically required skilled labor and have been time intensive.

It is desirable to be able to set a large number of stones in a short amount of time and with a fairly low degree of skill in order to reduce costs and increase related profits and production rates. This is especially true where large numbers of similar or identical gemstones are mounted in identical settings in jewelry manufacturing operations. The degree of skill that is required for the setting has hampered development of cost effective large scale stone mounting operations. Merely working faster and in larger numbers leads to mistakes and inaccuracies that degrade the jewelry quality. Therefore, a need exists to mechanize or automate the stone mounting process for jewelry settings in terms of preparing a properly dimensioned and centered seat, and swaging a stone in the center of the seat. These and related problems have prevented the development of faster, high precision, high quality, lower cost, stone mounting for large volumes of stones.

A mechanized cone setter has been used in the past to set base stones in jewelry. However, each shape and size of stone requires a particular sized and shaped setting die to set the stone. Once the die is selected the ring is placed in an arbor and the arbor is placed in the cone setting machine. The setting die is mounted in a ram directly above the ring. The stone and shims are positioned in the ring below the die. The die is then repeatedly forced over the stone to contact the set edge and to thereby, set the stone. Selection of the proper die typically requires skilled and knowledgeable workers as does the general assembly of the components of the cone setting machine. The use of skilled workers generally increases manufacturing costs. In addition, the repeated hammering action of the die being forced onto the ring by the ram can break the stones. Stones can be expensive and, therefore, the destruction of stones can dramatically increase the cost of manufacture. Therefore, a need exists for an apparatus and method for setting base stones that does not require substantial skill and that minimizes the breaking of stones during manufacture.

SUMMARY OF THE INVENTION

The present invention meets the above described needs and provides additional improvements and advantages that will be recognized by those skilled in the art upon review of the present disclosure. The present invention provides a method and apparatus for setting base stones in jewelry.

In one aspect, the present invention provides an apparatus for securing a stone in a setting in jewelry. The apparatus includes a base having a gripper assembly. The gripper assembly is configured to secure the jewelry to the base. The apparatus further includes a body secured relative to the base. The body includes at least two setting wheels that are rotatably secured to the body. The setting wheels are also rotatable relative to one another about a vertical axis. The setting wheels are spaced from one another to contact and roll a set edge of the jewelry secured in the gripper assembly and to thereby secure a stone within the setting of the jewelry. The apparatus can include a sputtering of gold deposited on an outer surface of the setting wheels. The setting wheels can be made from stainless steel which may also have a coating of titanium over its outer surface. When a coating of titanium is provided, the titanium can further be sputtered with gold. The apparatus can further include a vertical support to secure the body to the base, a vertical actuator secured to the vertical support, and a setting head secured to the vertical actuator to permit rotation of the setting head about the vertical axis and with the at least two setting wheels rotatably secured to the setting head.

In another aspect, the present invention provides a method for setting a base stone in jewelry. The method includes the step of securing the jewelry at a location. A base stone is then placed in a setting of the jewelry. The setting will typically include what is commonly known as a set edge to secure the stone to the jewelry. At least of pair of opposing setting wheels is then provided to contact the set edge of the jewelry and to roll about the setting along the set edge and to secure the stone within the setting.

Figure 1:
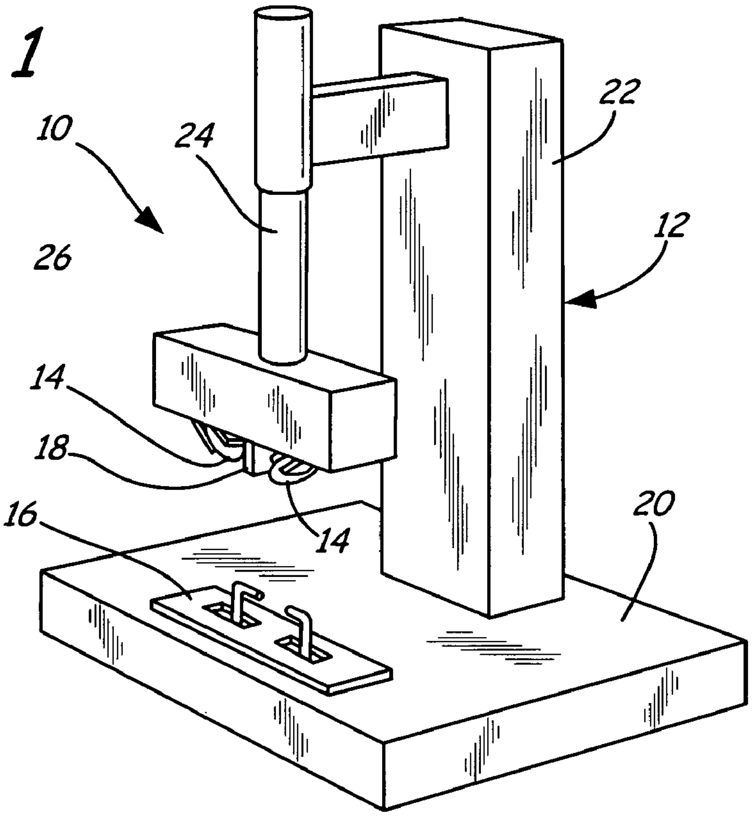
FIG. 1 illustrates a perspective view of an embodiment of an apparatus in accordance with the present invention.

All figures are drawn for ease of explanation of the basic teachings of the present invention only; the extensions of the figures with respect to number, position, relationship and dimensions of the parts to form the preferred embodiment will be explained or will be evident to those skilled in the art after the following description has been read and understood. Further, the exact dimensions and dimensional proportions to conform to specific force, weight, strength, and similar requirements will likewise be evident to those skilled in the art after the following description has been read and understood.

Where used in various figures or on multiple occasions within the same figures, the same numerals generally designate the same or similar parts. Furthermore, when the terms "vertical," "horizontal," "top," "bottom," "right," "left," "forward," "rear," "first" "second" "inside," "outside," and similar terms are used, the terms should be understood to reference only the structure shown in the drawings as it would generally appear to a person viewing the drawings and utilized only to facilitate describing the illustrated embodiment.

DETAILED DESCRIPTION OF THE INVENTION

The following discussion relates predominantly to the setting of precious or semiprecious stones or other similar adornments in rings. Those skilled in the art will appreciate that the present invention has much wider application. Particularly, the present invention may be used to set any stone or other suitably shaped and sized objects in any object formed from a malleable material without departing from the scope of the invention. However, the following disclosure describes the invention as it relates to setting stones in rings for ease of description and clarity.

FIG. 1 illustrates an embodiment of an apparatus 10 for setting base stones in jewelry in accordance with the present invention. Apparatus 10 includes body 12, at least two setting wheels 14 and a gripper assembly 16. Gripper assembly 16 is secured to body 12 or may be integral with body 12. Gripper assembly 16 is generally configured to secure a ring 90, illustrated in FIGS. 5A, 5B and 5C, in a desired position as the stone is set in a setting on ring 90. Setting wheels 14 are secured to body 12 to permit the rotation of each setting wheel 14. Body 12 is generally configured to maintain setting wheels 14 in or to bring setting wheels 14 into contact with a set edge 94 of ring 90 secured in gripper assembly 16 and to roll setting wheels 14 around set edge 94 of ring 90 to roll set edge 94 around a stone 92 and, thereby, to secure stone 92 to ring 90. Typically, the at least two setting wheels 14 are positioned on the body 12 so that the forces imparted on the jewelry during the setting of the stone substantially offset one another. That is, for example, in an embodiment having two setting wheels 14, setting wheels 14 may be configured so as to contact set edge 94 on diametrically opposite sides of the setting so that the forces imparted by setting wheels 14 on the ring 90 substantially cancel one another out. Similarly, for example, if three setting wheels 14 are utilized and each setting wheel 14 is exerting the same force on the ring 90, the three setting wheels 14 are each spaced 120 degrees apart around a central axis of the setting of the ring 90 to substantially cancel the forces exerted by the three setting wheels 14 on ring 90. A stone holder 18 can also be provided to hold the stone in position as setting wheels 14 roll set edge 94 of ring 90.

Figure 2:
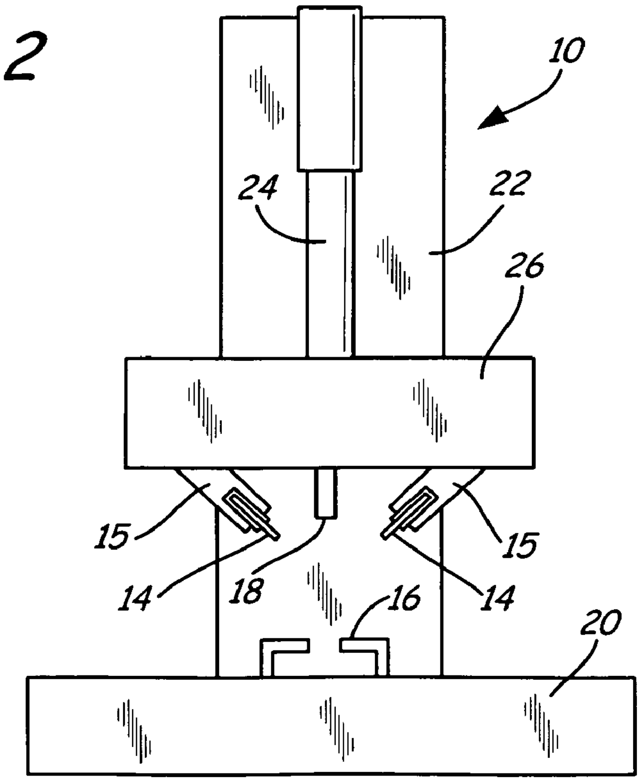
FIG. 2 illustrates a frontal view of an embodiment of an apparatus in accordance with the present invention.

As described above, body 12 is generally configured to guide setting wheels 14 around a setting in the ring 90 to secure a stone or other element within the setting. Body 12 can include a variety of different elements in a variety of configurations to accomplish the intended function of body 12 as will be evident to those skilled in the art upon review of the present disclosure. In the exemplary embodiment shown in FIGS. 1 and 2, body 12 includes a base 20, a vertical support 22, a vertical actuator 24 and a setting head 26.

Base 20 is generally designed to stably support apparatus 10 during a stone setting operation. Base 20 as illustrated provides the element to which gripper assembly 16 is secured. Typically in the embodiment shown, gripper assembly 16 will be secured to or integral with base 20.

As illustrated, vertical support 22 secures vertical actuator 24 to base 20. Vertical support 22 extending upward from base 20 to position the vertical actuator 24 relative to gripper assembly 16. Vertical actuator 24 is generally configured to position setting wheels 14 within a vertical axis. Vertical actuator 24 may be as a telescoping device in which the lower element is received within an upper element to vary the length of vertical actuator 24. The position of vertical actuator 24 as illustrated can be varied hydraulically, pneumatically, mechanically, electrically, magnetically or otherwise regulated as will be recognized by those skilled in the art. Thus, vertical actuator 24, in the illustrated embodiment, precisely positions setting head 26 and, thereby, setting wheels 14 precisely along the vertical axis to allow setting wheels 14 to contact set edge 94 of ring 90 secured in gripper assembly 16. Vertical actuator 24 may take any of a variety of forms, including, but not limited to, a robotic arm, a pneumatic cylinder, a hydraulic cylinder, an electrical/mechanical screw driven element, a gear driven element, a cable driven element, or other elements or combinations of components to precisely vertically position setting wheels 14 as will be recognized by those skilled in the art upon review of the present disclosure.

Setting head 26 is typically secured to vertical actuator 24 to permit vertical actuator 24 to vertically position setting wheels 14 attached to setting head 26. In the illustrated embodiment, setting head 26 is rotatably secured to vertical actuator 24 to enable the rotation of setting head 26 within a horizontal plane. Thus, setting wheels 14 are also rotated around the axis of rotation within the horizontal plane. Alternatively, a variety of configurations for apparatus 10 that permit the rotation of setting head 26 and, thereby, setting wheels 14, relative to gripper assembly 16 could be implemented by those skilled in the art upon review of the present disclosure. Generally for purposes of the present invention, the horizontal plane corresponds to a plane through set edge 94 of ring 90 secured in gripper assembly 16 to allow setting wheels 14 secured to setting head 26 to follow and roll along set edge 94 as setting head 26 is rotated within the horizontal plane. As illustrated, the horizontal plane is generally perpendicular to the vertical axis defined through the vertical actuator 24. To facilitate rotation in the horizontal plane, a rotational drive unit, not shown, is typically provided as a part of either setting head 26 or vertical actuator 24, although the rotational drive unit could be otherwise located. The rotational drive unit may be hydraulic, pneumatic, mechanical, electrical, magnetic or otherwise configured to rotate setting head 26 as will be recognized by those skilled in the art.

Setting wheels 14 are generally rotatably secured to setting head 26. Typically, setting wheels 14 are mounted on axels to permit the rotation of setting wheels 14. Setting wheels 14 are generally configured to permit each setting wheel 14 to contact on set edge 94 of ring 90. As illustrated, setting wheels 14 are angled at approximately a 45 degree angle to the horizontal plane to roll a set edge on a particular ring. The angle and spacing of setting wheels 14 may be varied to accommodate various set edges as will be recognized by those skilled in the art. Setting wheels 14 may be secured in a fixed location or setting wheels may be movably secured to setting head 26. When fixed, setting wheels 14 are spaced to contact set edge 94 of ring 90 when vertically positioned on set edge 94 by vertical actuator 24. When movably secured, setting wheels 14 may be movable within the horizontal plane such that when brought to an appropriate height by vertical actuator 24, setting wheels 14 may be moved by a horizontal drive unit 30 to bring setting wheels 14 into contact with set edge 94 of ring 90. Horizontal drive unit 30, illustrated for exemplary purposes as integral with setting head 26, may be hydraulic, pneumatic, mechanical, electrical, magnetic or otherwise configured to bring setting wheels 14 into contact with set edge 94 of ring 90 by moving setting wheels 14 within the horizontal plane as will be recognized by those skilled in the art.

Figure 3:
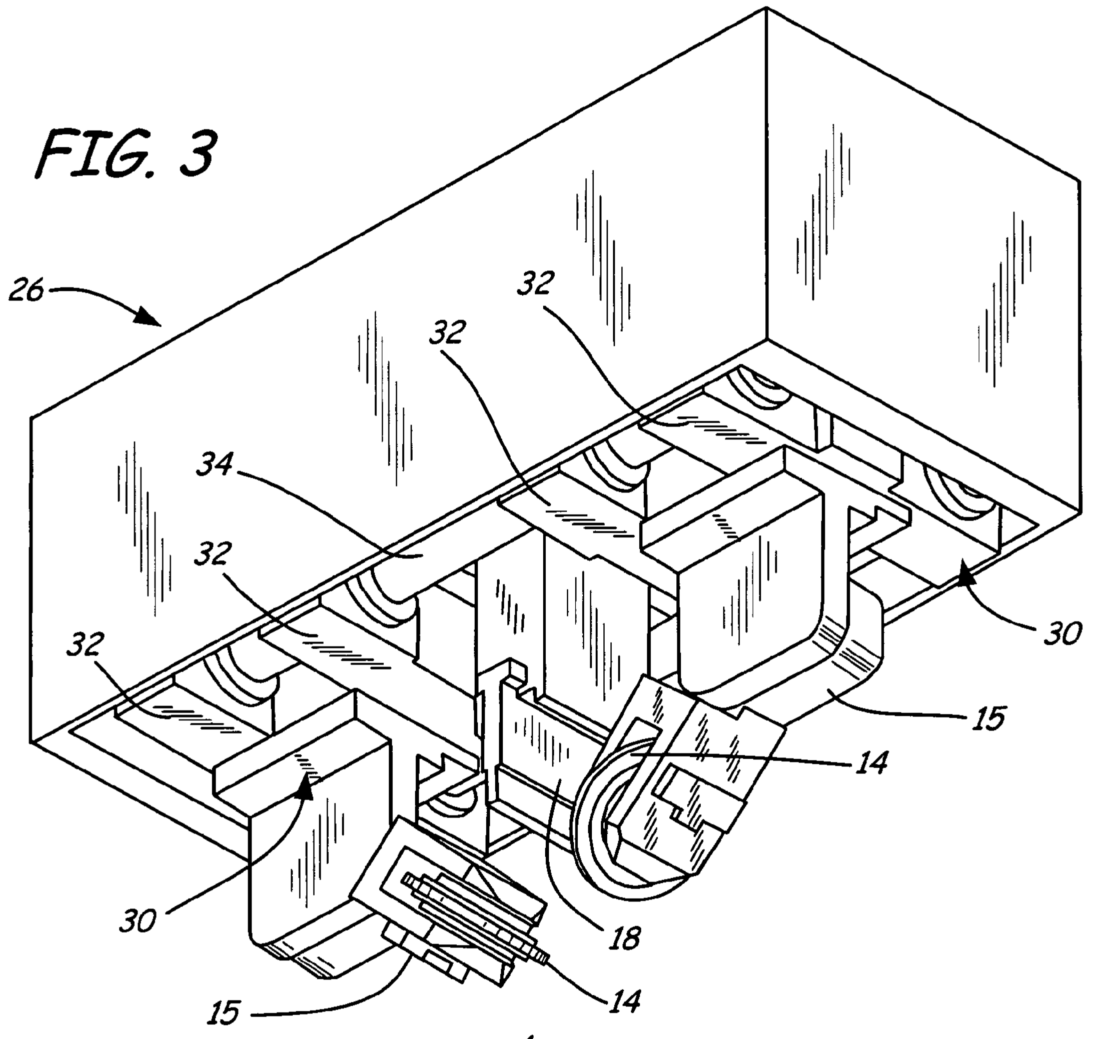
FIG. 3 illustrates a perspective view of an embodiment of a setting head including setting wheels in accordance with the present invention.

In the exemplary embodiment shown in FIG. 3, horizontal drive unit 30 includes one or more mounting blocks 32 to which wheel mounts 15 are connected. Each setting wheel 14 may be rotatably secured to an individual wheel mount 15, as illustrated. Mounting blocks 32 are configured to slidably receive one or more shafts 34 and to move laterally along at least one shaft 34. When a plurality of shafts 34 are provided the shafts 34 are typically parallel to one another. Each mounting block 32 may be connected to a pneumatic cylinder, not shown, to pneumatically drive the mounting block. Mounting blocks 32 may move independent of one another along the shafts 34 or may be configured to move simultaneously in opposite directions along the longitudinal axis of shafts 34. In this exemplary embodiment, one or more pneumatic cylinders may extend or compress to move the mounting blocks along shafts 34 during a setting operation. Setting wheels 14 are brought into contact with set edge 94 of ring 90 and follow the edge of set edge 94 as the setting wheels 14 are rotated about ring 90.

Setting wheels 14 are typically constructed from materials having sufficient strength to roll set edge 94 of ring 90. A sputtering of gold may also be applied to the surface of the setting wheels 14. In one aspect, the gold generally provides the finished set edge 94 with a more polished appearance. The gold puts a soft bumper between the hardened surface of the setting wheel and the ring. In one embodiment, setting wheels 14 are formed from stainless steel that is coated with titanium and sputtered with gold. Typically, setting wheels 14 are hardened to make them last longer. The titanium coating adds to the life span of setting wheels 14. Titanium can also provide an extremely hard surface for bending the set edges and is not subject to substantial deformation. In addition, the hard surface retains its polish so that the setting wheels 14 do not gall set edge 94 of ring 90 over the life span of setting wheels 14.

Figure 4:
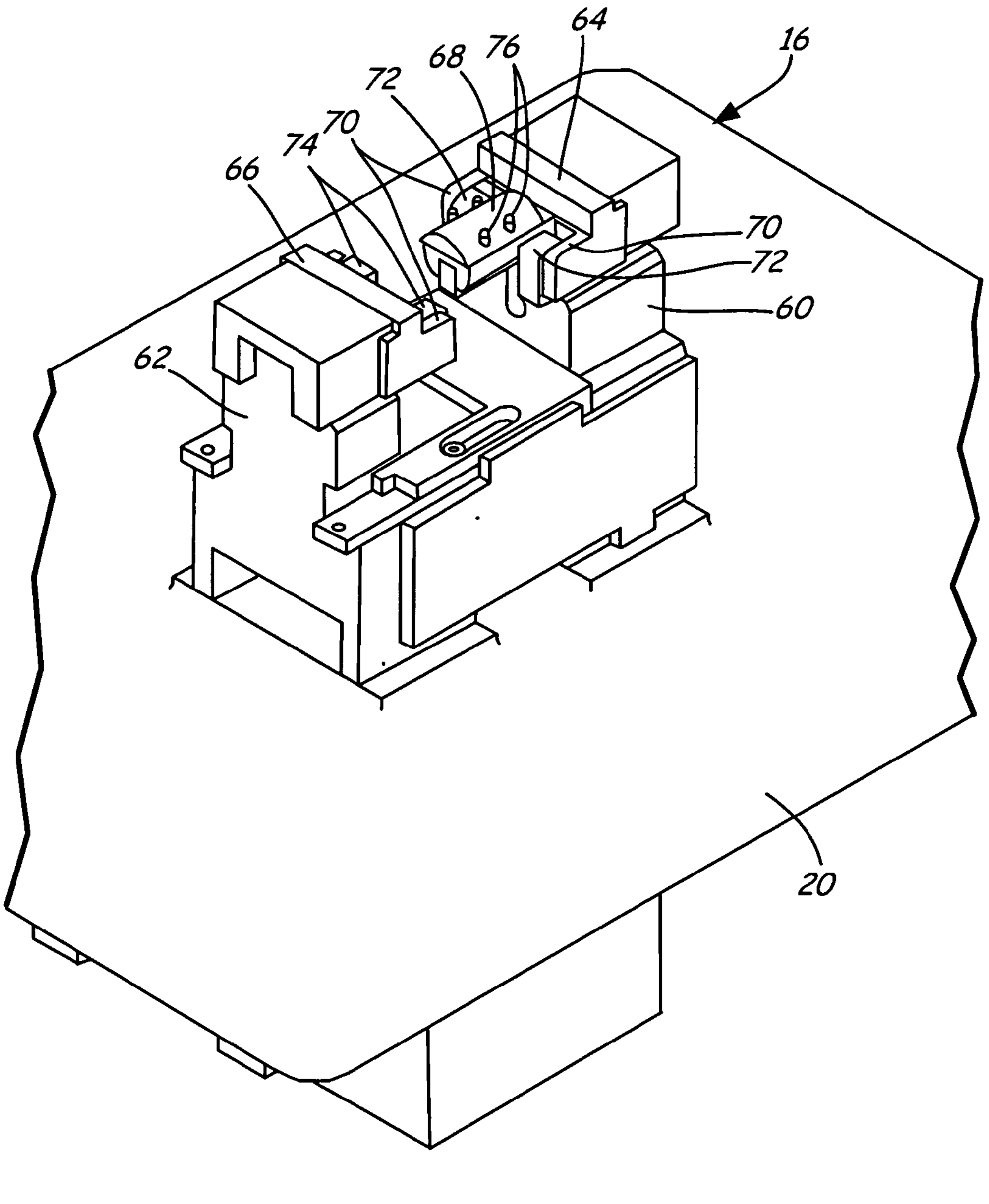
FIG. 4 illustrates an embodiment of a jewelry mount in accordance with the present invention.

Gripper assembly 16 is generally configured to precisely position and securely hold a ring. FIG. 4 illustrates details of an exemplary embodiment of gripper assembly 16. Gripper assembly 16 may comprise a first assembly body 60 and a second assembly body 62 each movable relative to one another to exert a securing force on a ring 90 held by gripper assembly 16. A first gripper 64 and a second gripper 66 may be mounted to or integral with first assembly body 60 and second assembly body 62, respectively. In one embodiment, first gripper 66 and second gripper 68 may be removable to allow alternatively sized first and second grippers to be secured to first assembly body 60 and second assembly body 62, respectively. First gripper 64 and second gripper 66 are shown including one or more gripper arms 70. Gripper arms 70 extend first gripper 64 and second gripper 66 so that one or more first gripper pads 72 and one or more second gripper pads 74 mounted to gripper arms 70 may secure ring 90 between first gripper pad 72 and second gripper pads 74. Thus, gripper pads are typically formed from a material or combination of a materials that tend to grip the material of ring 90 without damaging ring 90 or its finish. Gripper assembly 16 may further include a ring holder 68 positioned generally between the gripper arms 70 and shaped to receive ring 90. Ring holder 68 typically provides a robust mounting point to receive the forces exerted during a setting operation. Ring holder 68 may also include one or more detents 76 in an area on which the setting region 96 of ring 90 will rest when placed on ring holder 68. Detents 76 may be used to supplement the stabilization of ring 90 on ring holder 68 during the setting operation.

In operation of the above described exemplary embodiment of a gripper assembly, ring 90 is placed over ring holder 60 such that the setting region 96 on the inside of ring 90 is positioned over detents 76. First and second assembly bodies 60 and 62 are then moved relative to one another to secure ring 90 between first gripper pads 72 and second gripper pads 74.

Figure 5A:
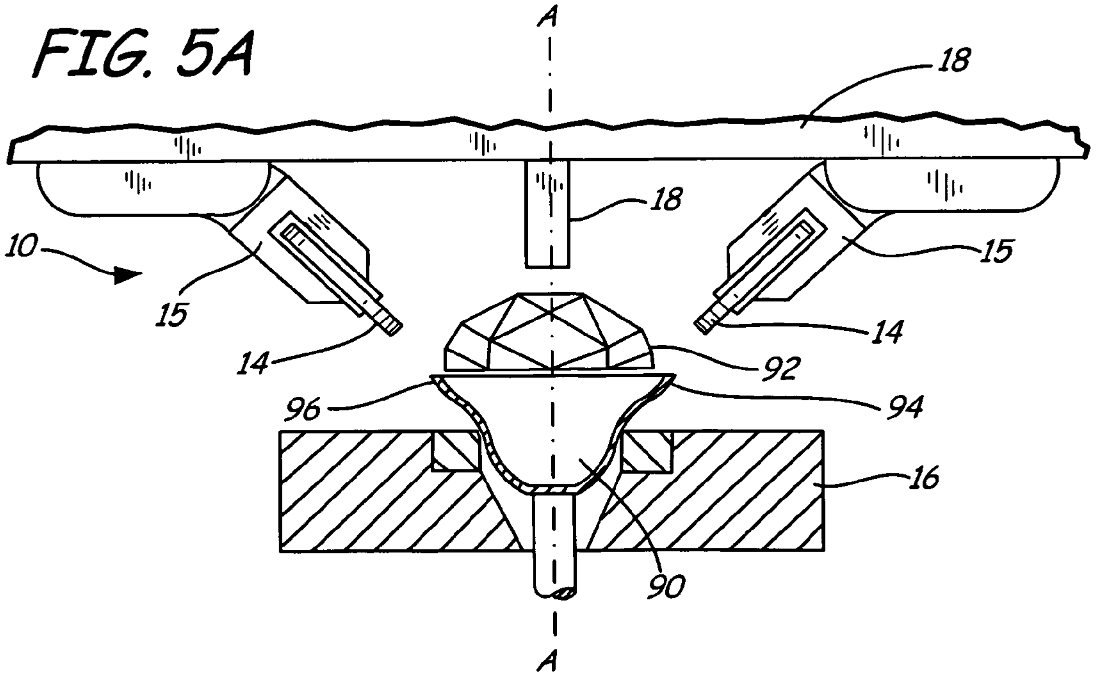
FIGS. 5A, 5B and 5C illustrate frontal views of an embodiment of an apparatus in accordance with the present invention at various stages of a stone setting operation.
Figure 5B:
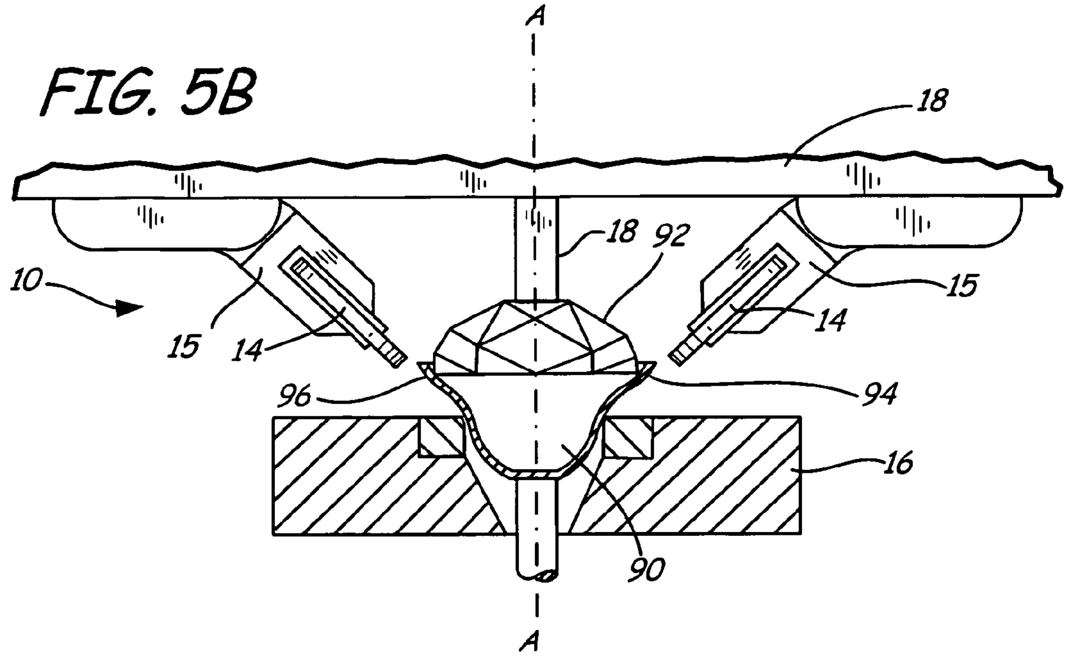
Figure 5C:
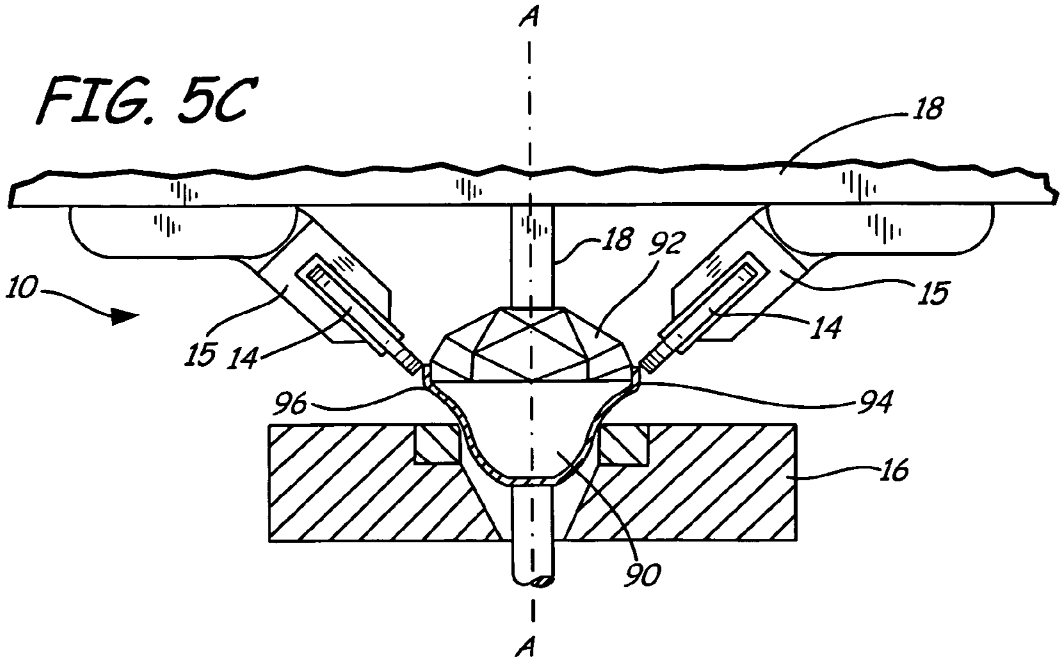

FIGS. 5A, 5B and 5C illustrate one exemplary embodiment for the operation of an embodiment of apparatus 10 as is generally illustrated in the Figures. Initially, appropriately sized gripping pads 72 and 74, illustrated in FIG. 4, are selected and installed on the gripper assembly 16 to securely grip ring 90. A pressure regulator is adjusted to provide the proper pressure from setting wheels 14 on set edge 94 of ring 90. Typically, the pressure from setting wheels 14 is about 40 pounds. The number of rotations of setting wheels 14 about set edge 94 of ring 90 are selected. The number of rotations of setting wheels 14 around the periphery of set edge 94 is typically adjusted at increments of one half rotation of setting head 26 for embodiments having two setting wheels 14. This permits the operator to control the number of individual passes of setting wheels 14 over a particular segment of set edge 94 of ring 90. Similarly, if apparatus 10 included three setting wheels 14, the embodiment could have the rotation of the setting head 26 adjustable in increments of one third rotation to control the number of passes of setting wheels 14 would have over a particular segment of set edge 94 of ring 90. Typically, about four passes of setting wheels 14 over each segment are sufficient to set a stone 92.

Once the parameters for the operation of apparatus 10 have been set, ring 90 is placed in gripper assembly 16. Gripper assembly 16 may then be set to secure ring 90 in a low pressure setting. A low pressure setting permits the fine adjustment of the position of ring 90 in gripper assembly 16. Typically, in the low pressure setting the ring is precisely leveled. Once leveled or otherwise positioned, gripper assembly 16 is set to a high pressure setting to firmly secure ring 90 for the setting operation. Stone 92 can then be placed on setting region 96 of ring 90. Setting head 26 can then be advanced by vertical actuator 24 to vertically align setting wheels 14 with set edge 94 of ring 90. Typically, this places setting wheels 14 at the same height as set edge 94. Stone holder 18 can push down against stone 92 to hold stone 92 in position within setting region 96. Setting wheels 14 are then brought into position against set edge 94 under a relatively low pressure and setting head 26 is rotated about ring 90 to roll setting wheels 14 about set edge 94 of ring 90. After a number of passes over a segment, the pressure of setting wheels 14 is increased to a second higher pressure to set edge 94 about stone 92. Typically, the pressure is increased after one half revolution of setting head 26 about ring 90 when setting head 26 includes two setting wheels 14. In the two setting wheel embodiment, setting head 26 will typically rotate a number of half revolutions set by the operator. After the number of revolutions set by the operator have been completed, setting wheels 14 are removed from set edge 94 of ring 90. Generally, by horizontal and/or vertical movement of setting wheels 14.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. An apparatus for setting a base stone in jewelry, comprising:

(a) a base having a gripper assembly to secure the jewelry to the base; and (b) a body secured relative to the base and having at least two setting wheels rotatably secured to the body and rotatable about a vertical axis to contact and roll a set edge of the jewelry secured in the gripper assembly to secure a stone to the jewelry.

2. The apparatus, as in claim 1, further comprising a sputtering of gold deposited on an outer surface of the setting wheels.

3. The apparatus, as in claim 1, with the setting wheels comprised stainless steel.

4. The apparatus, as in claim 3, further comprising having an outer surface of the setting wheels coated with titanium.

5. The apparatus, as in claim 4, wherein the titanium is sputtered with gold.

6. The apparatus, as in claim 1, with the body further comprising:

(a) a vertical support to secure the body to the base;

(b) a vertical actuator secured to the vertical support; and (c) a setting head secured to the vertical actuator to permit rotation of the setting head about the vertical axis and with the at least two setting wheels rotatably secured to the setting head.

7. The apparatus, as in claim 6, further comprising a sputtering of gold deposited on an outer surface of the setting wheels.

8. The apparatus, as in claim 7, with the setting wheels comprised of stainless steel.

9. The apparatus, as in claim 8, further comprising having an outer surface of the setting wheels coated with titanium.

10. The apparatus, as in claim 9, wherein the titanium is sputtered with gold.

11. A method for setting a base stone in jewelry, comprising:

(a) securing the jewelry at a location;

(b) placing the base stone in a setting of the jewelry, wherein the setting includes a set edge to secure the stone to the jewelry;

(c) providing at least a pair of opposing setting wheels to contact the set edge of the jewelry and to roll about the setting along the set edge and to secure the stone within the setting.

* * * * *

UNITED STATES PATENT AND TRADEMARK OFFICE

CERTIFICATE OF CORRECTION

PATENT NO. : 6,959,624 B2

DATED : November 1, 2005

INVENTOR(S) : Kelly Knutson and Todd Sarnstrom

It is certified that error appears in the above-identified patent and that said Letters Patent is hereby corrected as shown below:

Title page,

Item [75], Inventors, "Kelly Knuston" should read -- Kelly Knutson -- for each occurrence.

Signed and Sealed this

Twenty-fourth Day of January, 2006

JON W. DUDAS

*Director of the United States Patent and Trademark Office*